Figure 2:
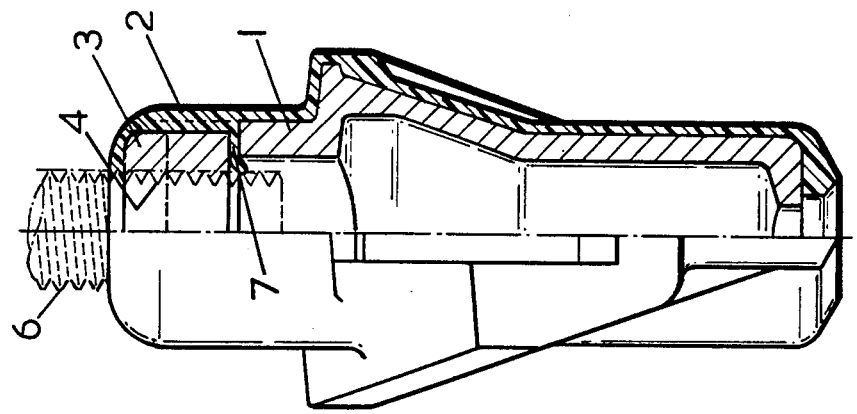

United States Patent [19]
Lambie

[11] 4,313,593
[45] Feb. 2, 1982

[54] GATE VALVES

[75] Inventor: John W. Lambie, Kilmarnock, Scotland

[73] Assignee: Neptune Glenfield Limited, Ayrshire, Scotland

[21] Appl. No.: 85,265

[22] Filed: Oct. 16, 1979

[30] Foreign Application Priority Data

Feb. 20, 1979 [GB] United Kingdom ............... 06035/79

[51] Int. Cl.³ .............................................. F16K 3/12
[52] U.S. Cl. .................................. 251/327; 264/261; 264/277; 251/356
[58] Field of Search ....................... 251/326, 327, 356; 137/375; 264/277, 261

[56] References Cited

U.S. PATENT DOCUMENTS

| 3,738,383 | 6/1973 | David | 137/375 X |
| 3,742,995 | 7/1973 | Confer et al. | 264/277 X |
| 3,763,880 | 10/1973 | Leopold et al. | 251/327 X |
| 4,214,604 | 7/1980 | Rumsey | 137/375 |
| 4,226,550 | 10/1980 | Kupcak et al. | 264/274 X |

FOREIGN PATENT DOCUMENTS

| 420760 | 3/1967 | Switzerland | 137/375 |
| 499548 | 1/1939 | United Kingdom | 251/327 |

Primary Examiner—Arnold Rosenthal
Attorney, Agent, or Firm—Larson and Taylor

[57] ABSTRACT

A gate for a gate valve is formed with an undercut groove in which is inserted a screw-threaded coupling member formed with a screw-threaded hole which is a clearance fit into the groove. The screw-threaded hole is plugged then the gate containing the coupling member is inserted into a mould into which coating material in a fluid state is introduced under pressure so as to cover the gate and penetrate into the clearance gaps between the adjacent faces on the coupling member and the groove in the gate. The invention also comprises a coated gate formed by the process described.

2 Claims, 2 Drawing Figures

GATE VALVES

This invention relates to gate valves and particularly to gate valves of the type in which the gate is encased in a resilient coating. It has become the practice to manufacture gate valves at least in small sizes with the gate encased in a coating of resilient material, which may be rubber or a rubber-like material. This allows the use of a valve body in the "as cast" condition without any machining of the valve faces being necessary because the resilient coating adjusts itself to the unmachined surfaces and still provides a good seal.

For movement of the gate in the valve body the usual mechanism comprises an operating screw engaging a screw-threaded coupling member formed with a flange engaging an undercut groove in the gate so that the coupling member is held captive and against rotation in the gate. This undercut groove is customarily T-shaped in cross section. In present practice when the gate is being encased in the resilient coating the coating material either fills or partially fills the groove and has then to be cut away to allow for entry of the coupling member, or a plug must be fitted into the groove to prevent entry of the coating material into the groove. Either method causes some difficulty because removal of the coating material from the groove is a troublesome business while if the groove has been previously plugged it is of course completely clear of coating material but the coating material has to be cut away at the appropriate places to allow the plug to be removed. Also the hard contact surfaces between the coupling member and the gate casting make no provision for minor misalignments between the operating spindle and the gate and/or the seat for the gate thus allowing a certain amount of distortion to occur particularly in the spindle and in the resilient coating when the gate is forced into its seat.

It is an object of the present invention to eliminate the necessity for such a special fitting operation for inserting the coupling member into a gate of the coated type and also to eliminate distortions resulting from any misalignments in the parts of a valve.

According to the invention a coated gate for a gate valve is formed by inserting a coupling member into an undercut groove provided in the gate to receive the coupling member, the coupling member being a clearance fit in the groove and being formed with a screw-threaded hole for reception of a screw-threaded operating spindle, plugging the screw-threaded hole in the coupling member, inserting the gate incorporating the coupling member into a mould and forcing coating material in a fluid state under pressure into the mould so as to fill the mould and form a one piece coating embracing the gate and the coupling member fitted thereto and penetrating into the clearance gaps between the adjacent faces on the coupling member and the groove in the gate thereby locking the coupling member into the gate by the coating of resilient material, removing the gate from the mould when the coating material has set and removing the plug from the screw-threaded hole in the coupling member.

Also according to the invention a coated gate for a gate valve comprises a gate casting formed with an undercut groove, a coupling member formed with a screw-threaded hole for reception of a screw-threaded spindle, said coupling member being located within the undercut groove and being formed to be a clearance fit in the groove, and a one piece resilient coating covering the gate casting and the coupling member which is embedded in the resilient coating and penetrating into the clearance gaps between the adjacent faces of the coupling member and the groove in the gate, the entrance to the screw-threaded hole being left clear of the coating material.

Figure 1:
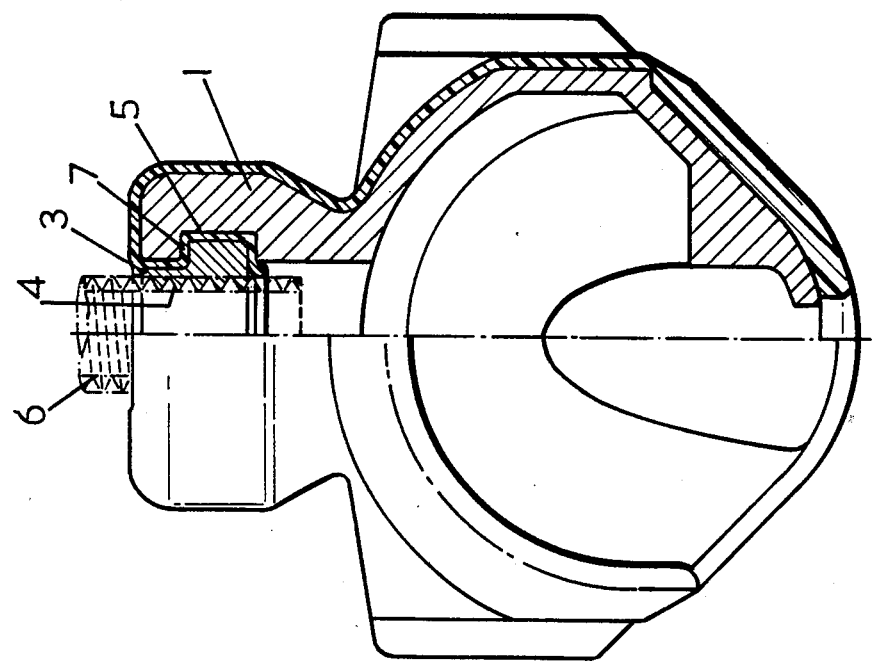

A practical embodiment of a gate according to the invention is illustrated in the accompanying drawings in which FIG. 1 is a view of a gate looking towards one of the sealing faces of the gate. The left hand half of the view is an exterior view of the gate and the right hand half is a section through the gate.

FIG. 2 is a side view of the gate also half-sectioned.

In the drawings 1 denotes a metal casting forming the metallic part of the gate, 2 denotes a one piece resilient coating, 3 denotes a coupling member formed with a screw-threaded hole 4 fitted to a groove 5 formed in the gate casting 1 and 6 denotes a screw-threaded operating spindle passing through the screw-threaded hole 4 in the coupling member and into the hollow interior of the gate. The coupling member 3 is a clearance fit in the groove 5 before the coating 2 is applied.

The coated gate can be fitted into a valve body immediately after coating without any operation of engaging the coupling member 6 into the groove 5 or cutting away portions of the coating.

The method of the invention also has the very useful effect that the coating material in the clearance gaps between the "as cast" surfaces of the coupling member 3 and the groove 5 form resilient laminae (indicated at 7) between these surfaces. Backlash between the coupling member 3 and the gate casting 1 is thus eliminated while still allowing some degree of relative movement between the coupling member and the gate casting because of the resilience of the material forming the laminae. The gate thus has a degree of freedom to adjust itself so that it will always seat properly in the valve body.

What is claimed is:

1. A method of forming a coated gate for a gate valve, the gate incorporating a coupling member which is located with a clearance fit in an undercut groove in the gate and which is formed with a screw-threaded hole for reception of a screw-threaded operating spindle, comprising the steps of plugging the screw-threaded hole in the coupling member, inserting the gate incorporating the coupling member into a mould and forcing coating material in a fluid state under pressure into the mould so as to fill the mould and form a one piece coating embracing the gate and the coupling member fitted thereto and penetrating into the clearance gaps between the adjacent faces on the coupling member and the groove in the gate thereby locking the coupling member into the gate by the coating of resilient material, removing the gate from the mould when the coating material has set and removing the plug from the screw-threaded hole in the coupling member.

2. A coated gate for a gate valve comprising a gate casting formed with an undercut groove, a coupling member formed with a screw-threaded hole for reception of a screw-threaded spindle, said coupling member being located within the undercut groove and being formed to be a clearance fit in the groove, and a one piece resilient coating covering the gate casting and the coupling member which is embedded in the resilient coating, said coating penetrating into the clearance gaps between the adjacent faces of the coupling member and the groove in the gate, the entrance to the screw-threaded hole being left clear of coating material.

* * * * *